United States Patent [19]
McDonald et al.

[11] Patent Number: 4,560,394
[45] Date of Patent: Dec. 24, 1985

[54] OXYGEN ENRICHMENT SYSTEM

[75] Inventors: George H. McDonald, Palos Verdes Estates; Scott A. Manatt, Granada Hills, both of Calif.

[73] Assignee: The Garrett Corporation, Los Angeles, Calif.

[21] Appl. No.: 332,395

[22] Filed: Dec. 18, 1981

[51] Int. Cl.$^4$ .............................................. B01D 53/22
[52] U.S. Cl. ............................................. 55/16; 55/27; 55/158; 55/269
[58] Field of Search ........................ 55/16, 23, 27, 158, 55/267, 269; 210/137, 321.1, 416.1, 506

[56] References Cited

U.S. PATENT DOCUMENTS

| | | | |
|---|---|---|---|
| 2,194,913 | 3/1940 | Rossi | 60/15 |
| 3,193,991 | 7/1965 | Browning et al. | 55/185 |
| 3,324,626 | 6/1967 | Dresser et al. | 55/16 |
| 3,336,730 | 8/1967 | McBride et al. | 55/27 X |
| 3,405,058 | 10/1968 | Miller | 210/506 X |
| 3,489,144 | 1/1970 | Dibelius et al. | 55/158 X |
| 3,498,053 | 3/1970 | Johnston | 60/13 |
| 3,713,271 | 1/1973 | Franz et al. | 55/16 |
| 3,976,451 | 8/1976 | Blackmer et al. | 55/158 |
| 3,979,190 | 9/1976 | Hedman | 55/16 X |
| 3,979,913 | 9/1976 | Yates | 60/618 |
| 3,989,478 | 11/1976 | Jones | 55/23 X |
| 4,007,025 | 2/1977 | Hegemann | 55/213 |
| 4,052,042 | 10/1977 | Hegemann et al. | 266/89 |
| 4,081,508 | 3/1978 | Luckenbach | 423/210 |
| 4,198,213 | 4/1980 | Mannatt | 55/16 |
| 4,285,917 | 8/1981 | Knight | 55/23 X |
| 4,312,851 | 1/1982 | Isalski et al. | 55/23 X |
| 4,321,137 | 3/1982 | Kohler | 210/416.1 X |

FOREIGN PATENT DOCUMENTS 1280640 7/1972 United Kingdom .

OTHER PUBLICATIONS

Sourirajan, Reverse Osmosis, 1970, pp. 38 and 39.
Sourirajan, Reverse Osmosis and Synthetic Membranes, 1977, chapter 26, pp. 527–540.

Primary Examiner—Robert Spitzer
Attorney, Agent, or Firm—James W. McFarland; Albert J. Miller

[57] ABSTRACT

A continuous oxygen enrichment system having waste energy recovery provisions.

12 Claims, 3 Drawing Figures

OXYGEN ENRICHMENT SYSTEM

BACKGROUND OF THE INVENTION

This invention relates to continuous oxygen enrichment systems, and relates more particularly to method and apparatus for recovering waste energy therefrom.

Continuous oxygen enrichment or oxygen separation systems are operable to continuously separate an airflow into oxygen-depleted and oxygen-enriched gas streams through use of a membrane which has relatively high permeability characteristics with respect to oxygen and relatively low permeability to nitrogen. Examples of such separation devices may be found in U.S. Pat. No. 4,198,213 to Scott A. Manatt, as well as copending U.S. Patent Application Ser. No. 289,861 filed Aug. 4, 1981, now U.S. Pat. No. 4,508,548, entitled "Air Oxygen and Nitrogen Concentration Device" and having common assignee with the present application. As discussed in greater detail in the above-referenced patent and application there are various manners of utilizing the resultant oxygen-enriched and oxygen depleted gas streams. For example, oxygen-enriched gas streams are quite useful in aircraft for increasing the oxygen content of air for breathing, particularly at higher altitude levels. Also, the oxygen-depleted, or in other words a nitrogen enriched gas stream has utility for inerting fuel tanks or other enclosed spaces. Characteristically, such systems are capable of continuously supplying the oxygen-enriched and oxygen-depleted air streams in contrast to other prior art arrangements wherein oxygen concentrated gases are generated on intermittent or batch stream bases. To operate on a continuous basis, a relatively high pressure differential must normally be maintained across the oxygen permeable membrane.

SUMMARY OF THE INVENTION

It is an object of the present invention to improve the thermodynamic efficiency for continuous oxygen enrichment systems in order to minimize the power consumed thereby through use of waste energy recovery apparatus and method.

A more particular object is to utilize turbo-machinery for recovering the energy maintained in the pressurized, oxygen depleted stream downstream of the membrane separator of an oxygen enrichment system.

A further object of the present invention is to utilize a turbine which is driven by the pressurized, oxygen depleted gas stream in order to recover energy therefrom, and to reintroduce this energy into the enrichment system to minimize consumed power.

Yet another object of the present invention is to improve the thermodynamic efficiency of an oxygen enrichment system as set forth in the preceding objects by utilization of heat transfer method and apparatus for reducing temperature of the pressurized air delivered to the membrane.

In summary, the invention contemplates method and apparatus for separating a relatively pressurized air flow into oxygen-enriched and oxygen-depleted gas streams by directing the air flow to a membrane member which is relatively permeable to oxygen and relatively non-permeable to nitrogen. The exhausted, relatively pressurized oxygen-depleted gas stream downstream of the membrane member is utilized to drive the turbine of a turbocompressor set. The compressor rotatably driven by the turbine may be alternately utilized to assist in pressurizing the air flow being delivered to the membrane member or, in a subatmospheric oxygen enrichment system, utilized to increase the pressure of the oxygen-enriched stream at a location downstream of the membrane. A regenerative heat exchanger may be utilized between the pressurized air flow and the oxygen-depleted streams to remove heat from the pressurized air prior to its delivery to the membrane, and transfer this heat to the oxygen-depleted gas flow at a location upstream of the turbine to increase the energy level of the oxygen-depleted stream and convert this otherwise wasted heat into rotational energy for driving the compressor. Additional heat extraction and heat transfer may be utilized to further improve the overall thermodynamic efficiency of the oxygen enrichment system. The turbine for assisting in pressurizing the inlet gas air flow to the membrane member may be assisted by an external power source.

These and other objects and advantages of the present invention are specifically set forth in or will become apparent from the following detailed description of preferred arrangements of the invention when read in conjunction with the accompanying drawing.

DETAILED DESCRIPTION OF THE PREFERRED EMBODIMENT

Figure 1:
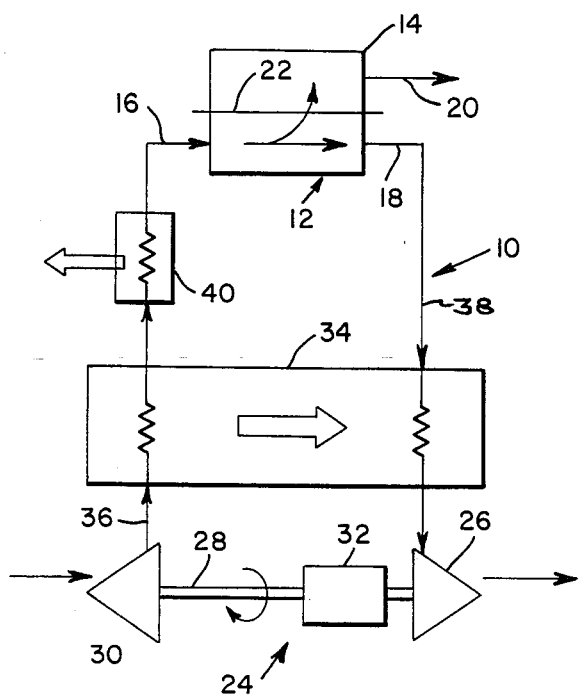
FIG. 1 is a schematic representation of a preferred embodiment of the invention.

Referring now more particularly to FIG. 1, an oxygen enrichment system generally referred to by the numeral 10 includes a membrane type air separation module 12 which includes a housing 14 having a pressurized air inlet 16 and first and second outlets 18 and 20. The separation device further includes a membrane member 22 disposed within housing 14 so as to separate and relatively isolate the pressurized air inlet 16 from outlet 20.

Membrane member 22 is characterized by its relatively high permeability to oxygen and relatively low permeability to nitrogen. A more complete description of such a membrane device, to the extent necessary to a complete understanding of the present invention, may be found in the previously referenced U.S. Pat. No. 4,198,213, or within copending application Ser. No. 289,861, now U.S. Pat. No. 4,508,548, also discussed above. Additional membrane arrangements may also be included within the air separation device, such as described in Ser. No. 289,861, now U.S. Pat. No. 4,508,548, in order to enhance the nitrogen concentration as well as oxygen concentration capabilities of the device. While a detailed description of this specific structure in operation of such an air separation device is not necessary to a complete understanding of the present invention, it is to be noted that such continuously operating type separation devices are most efficient when a substantial pressure differential is maintained across the membrane. For this reason, in a device of the type described wherein the output of the oxygen enrichment stream is desired to be at atmospheric levels, a relatively high pressure of air flow into inlet 16 is required for optimum operation.

Oxygen enrichment system 10 further includes a turbocompressor generally referred to by numeral 24. Turbocompressor 24 includes a turbine 26 mounted to drive a shaft 28 upon which a driven compressor 30 is rotatably mounted. By way of a duct 38, turbine 26 receives pressurized gas flow from outlet 18 of the separation device 12 to be driven thereby. In response, the compressor is disposed within the air flow stream in a duct 36 leading to the air separation device 12 to pressurize the air flow being delivered thereto. Dependent upon the pressure of air available as a source to compressor 30, the type of air separation device 12 utilized, and the desired rates of continuous separation of the air into oxygen-depleted and oxygen-enriched gas streams, an additional power source or power supply 32 may be utilized in conjunction with turbine 26 in order to drive compressor 30. In FIG. 1 the means for assisting the turbine in driving the compressor is illustrated as a motor for delivering rotational power to shaft 28. It will be apparent to those skilled in the art that a variety of manners of developing additional power for operating compressor 30 may be utilized.

A regenerative heat exchanger 34 in FIG. 1 is operable to extract heat from the pressurized air supply in duct 36 at a location between the compressor 30 and the inlet 16, and to transfer this heat to the gas stream carried in conduit 38 extending from one outlet 18 of the air separation device to the inlet of the turbine 26. Extraction of the heat from the compressed air flow and duct 36 further improves the thermodynamic capabilities of the overall system, and the transferral of this otherwise wasted heat into the gas stream in conduit 36 upstream of the turbine increases the energy level of gas flow being delivered to the turbine such that this extracted heat from conduit 34 is ultimately transformed into mechanical energy for assisting in driving compressor 30. Due to property limitations of the material of membrane 22, it is important that the compressed airflow required at inlet 16 be relatively low in temperature, at least in comparison to the heat rise caused by compressor 30. Thus, an additional heat sink 40 intermediate the regenerative heat exchanger 34 and the inlet 16 may be included in duct 36 to further cool the pressurized air flow being delivered to inlet 16.

In operation, an air flow, which may either be at ambient or partially pressurized conditions, is delivered to the inlet of compressor 30, compressed to a sufficiently high state for continuous and efficient operation of the air separation module 30, and thereupon delivered to the inlet 16 of the air separation device 12. The membrane 22 is operable to permit only oxygen concentrated flow of gas thereacross and to outlet 20. Accordingly, an oxygen-enriched gas flow stream at relatively low pressure is directed through outlet 20 to be utilized as desired. On the other side of the membrane 22, the remaining, pressurized, oxygen-depleted gas flow stream is directed through outlet 18 and duct 38 to turbine 36 to drive the latter. Turbine 36, either by itself in the instance of a partially pressurized air flow into compressor 30, or in conjunction with the additional power supply 32, is operable through shaft 28 to develop the mechanical energy necessary to drive compressor 30 and deliver air flow at the necessary pressure to the air separation device. Through utilization of turbocompressor 24 the energy existing in the pressurized, oxygen-depleted gas stream in duct 38 is recovered and returned back into the oxygen enrichment system to minimize the power consumed by this system. For instance, in the situation wherein additional power supply 32 is utilized to drive compressor 30, it will be seen that the power developed by the pressurized, oxygen-depleted gas flow in driving turbine 26 substracts directly from the power required from source 32 in driving compressor 30.

Regenerative heat exchanger 34, as discussed above, is operable to recover additional waste energy from the overall system and improve the thermodynamic efficiency thereof. By cooling the pressurized air flow in duct 36 and returning this extracted heat energy back into the system by heating the oxygen-depleted gas flow in duct 38 for increasing its energy level in driving turbine 36, heat exchanger 34 has a positive effect on the overall thermodynamic efficiency of the system as well as contributing to the required cooling of air in duct 36.

Figure 2:
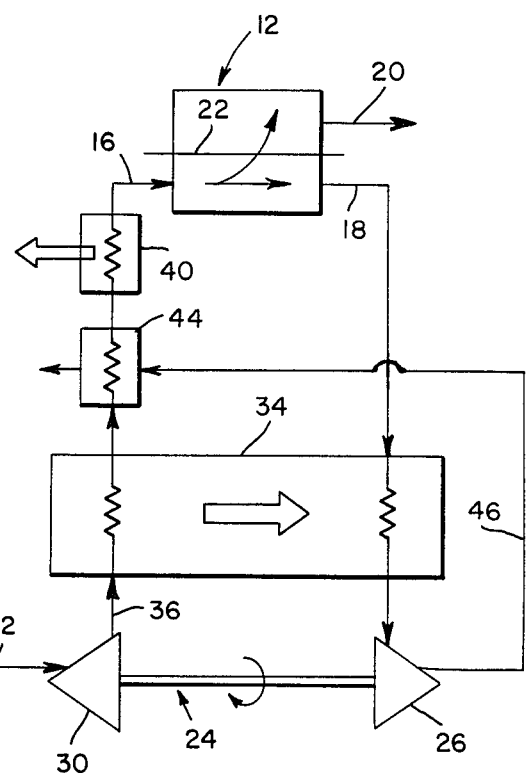
FIG. 2 is a schematic representation of an alternate embodiment of the invention.

In FIG. 2 an alternate arrangement of the present invention includes a turbocompressor 24, regenerative heat exchanger 34, and air separation module 12 as discussed previously with regard to the FIG. 1 arrangement. These common elements with FIG. 1 are also arranged in the same manner such that they operate as discussed previously. Additionally, FIG. 2 illustrates that the invention may be utilized without a separate power source for directly driving compressor 30. In the FIG. 2 arrangement a supply of air at a sufficiently high pressure in duct 42 is delivered directly to compressor 30 such that turbine 26 can boost the inlet pressure to the desired level. In addition to the heat sink 40 which operates as previously described with respect to FIG. 1, the FIG. 2 arrangement includes another heat exchanger 44 disposed in conduit 36 intermediate the regenerative heat exchanger 34 and the heat sink 40. Exhaust of the oxygen-depleted gas flow stream from turbine 26 is directed through duct 46 to heat exchanger 44. The heat exchanger 44 thereby acts as another heat sink in transferring heat from the pressurized air flow in duct 36 to the exhausted oxygen-depleted gas flow in duct 46. In such arrangement it will be apparent that to the extent that heat exchanger 44 is operable in extracting heat from the air flow in passage 36, the external energy required by heat sink 40 is concomitantly reduced.

Figure 3:
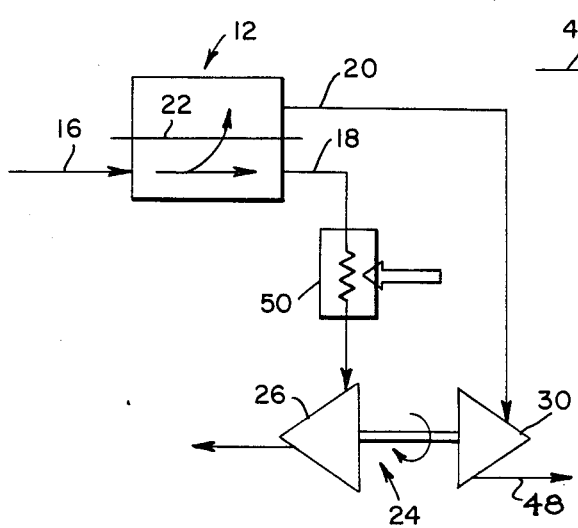
FIG. 3 is yet another embodiment of the invention as utilized in a sub-atmospheric system.

FIG. 3 illustrates an embodiment of the invention as may be utilized in a sub-atmospheric type of system. This system utilizes an air separation module 12 as discussed previously, and has its outlet 18 interconnected to deliver the oxygen-depleted gas flow to the turbine 26 of turbocompressor 24. In contrast to the previous embodiments however, the subatmosheric system illustrated in FIG. 3 has an atmospheric or partially pressurized air flow delivered to inlet 16 of the air separation module 12. Due to the necessary pressure differential which must be required to be maintained across membrane 22 for continuous operation of the air separation device 12, the pressure of the oxygen-enriched gas flow stream delivered through outlet 20 is at a substantially low, subatmospheric level. The turbocompressor 24 is arranged in FIG. 3 such that the compressor 30 is disposed within the oxygen enriched exhaust gas flow stream from outlet 20 of the separation device. The turbocompressor is therefore operable to recover energy from the oxygen-depleted gas stream exhausting from outlet 18 in driving turbine 26 and thus compressor 30 in order to increase the pressure of the oxygen enriched stream. Accordingly, the oxygen-enriched stream is exhausted from compressor 30 through a duct 48 at a substantially higher pressure than at outlet 20 to permit better utilization of the oxygen-enriched stream. This avoids or at least reduces the necessity of introducing energy into the system from an external source simply to pressurize the sub-atmospheric exhaust in outlet 20. Accordingly, by eliminating or reducing the external energy needed to pressurize the oxygen-enriched stream, the arrangement in FIG. 3 further increases the overall efficiency of the air separation device. Dependent upon the system utilized, a source of waste heat energy may be available and to utilize such waste heat energy, it is contemplated that a heat exchanger 50 may be disposed in the oxygen-depleted stream intermediate of the outlet 18 and the turbine 26 in order to increase the energy in this air flow in driving turbine 26. The exhaust from turbine 26 is directed to a sub-atmospheric environment in order to maintain the necessary pressure differential across the turbine for driving thereof.

Accordingly, it will be apparent that the present invention provides method and apparatus for improving the thermodynamic efficiency of an oxygen enrichment system by recovering the wasted energy otherwise thrown away with the exhausting oxygen-depleted gas stream, and reintroducing this energy back into the oxygen enrichment system. This recovered energy may be reintroduced back into the air flow itself as in FIGS. 1 and 2 by driving the compressor to pressurize the inlet air flow, or may be utilized to increase the pressure of the oxygen-enriched stream emanating from a sub-atmospheric type of oxygen enrichment system as illustrated in FIG. 3.

From the foregoing it will be further apparent that the present invention provides an improved method for recovering waste energy in a continuous oxygen enrichment system by dividing a supply of air into oxygen-enriched and oxygen-depleted gas flows, driving a turbine with the oxygen depleted gas flow to recover waste energy, and then reintroducing the recovered waste energy into the system in a manner increasing the overall thermodynamic efficiency of the system. Further, the present invention also contemplates a method for continuously producing a stream of oxygen-enriched gas from air by the steps of compressing the supply of air, separating the compressed air into oxygen-enriched and oxygen depleted streams, driving a turbine with the oxygen-depleted stream to produce mechanical energy, and then using the mechanical energy to assist in compressing the air supply. Further improvement of the thermodynamic efficiency of this system is accomplished by transferring heat from the compressed air supply to the oxygen-depleted stream, either upstream or downstream of the turbine.

Various alterations and modification to the above detailed description of preferred arrangements of the invention will be apparent to those skilled in the art. Accordingly, the foregoing should be considered as exemplary in nature and not as limiting to the scope and spirit of the invention as set forth in the appended claims.

Having described the invention with sufficient clarity that those skilled in the art may make and use it, we claim:

1. A continuous oxygen enrichment system comprising:
    a compressor for producing a supply of pressurized air;
    membrane means for continuously dividing said supply of pressurized air into oxygen-enriched and oxygen-depleted streams;
    a turbine rotatably driven by said oxygen-depleted stream, said turbine operably connected to said compressor to drive the latter; and
    a regenerative heat exchanger between said compressor and said membrane means for transferring heat from said supply to said oxygen-depleted stream at a location upstream of said turbine.

2. A continuous oxygen enrichment system as set forth in claim 1, further including a heat sink for extracting further heat from said supply prior to its delivery to said membrane means.

3. A continuous oxygen enrichment system as set forth in claim 2, further including another heat exchanger for transferring further heat from said supply to said oxygen-depleted stream subsequent to its exhaust from said turbine.

4. A continuous oxygen enrichment system as set forth in claim 1, further including a power supply for assisting said turbine in driving said compressor.

5. In an oxygen enrichment system: a compressor for producing a supply of pressurized air; means for continuously dividing said supply of pressurized air into an oxygen-enriched gas flow and a pressurized oxygen-depleted gas flow; a turbine rotatably driven by said oxygen-depleted gas flow and operably connected to said compressor to mechanically drive the latter; a first heat exchanger in communication with said supply of pressurized air upstream of said means for continuously dividing, and in communication with said pressurized oxygen-depleted gas flow upstream of said turbine for transferring heat from said supply to said oxygen-depleted gas flow; a second heat exchanger disposed between said first heat exchanger and said means for continuously dividing; and means for directing exhaust of said oxygen-depleted gas flow from said turbine to said second heat exchanger.

6. A system as set forth in claim 5, wherein said means for continuously dividing said supply includes membrane means having a relatively high rate of permeation of oxygen therethrough and a relatively low rate of permeation of nitrogen therethrough.

7. A system as set forth in claim 5, wherein said means for continuously dividing said supply includes a housing having an inlet for receiving said supply of pressurized air, a first outlet for directing said pressurized oxygen-depleted gas flow to said turbine, and a second outlet for said oxygen-enriched gas flow; and membrane means for separating said inlet from said second outlet whereby a relatively high pressure differential is maintained across said membrane means; said membrane means being relatively permeable to oxygen and relatively nonpermeable to nitrogen whereby said supply of pressurized gas delivered to said inlet is continuously separated into said oxygen-enriched and oxygen-depleted gas flows.

8. A system for continuously generating an oxygen-enriched gas flow comprising: a compressor for producing a pressurized supply of air; a housing having an inlet receiving said pressurized supply of air and first and second outlets; a membrane member disposed between said inlet and said second outlet, said membrane member having a relatively highly permeability to oxygen to permit flow of oxygen-enriched gas flow therethrough to said second outlet and create a pressurized flow of oxygen-depleted gas to said first outlet; a turbine communicating with said first outlet and operably driven by said pressurized flow of oxygen-depleted gas; a shaft interconnecting said turbine and compressor whereby said turbine drives said compressor; and a heat exchanger for transferring heat from said pressurized supply of air at a location upstream of said inlet, to said flow of oxygen-depleted gas at a location downstream of said first outlet.

9. An oxygen enrichment system comprising:
a source of airflow;
means for receiving and continuously dividing said airflow into oxygen-enriched and oxygen-depleted gas flows;
a turbine driven by said oxygen-depleted gas flow for recovering energy therefrom;
means driven by said turbine for re-introducing said recovered energy into said oxygen-enriched gas flow; and
a heat exchanger for transferring heat to said oxygen-depleted gas flow upstream of said turbine.

10. A method for continuously producing a stream of oxygen-enriched gas from air comprising:
compressing a supply of air;
separating the compressed supply of air into oxygen enriched and oxygen-depleted streams;
driving a turbine by said oxygen-depleted stream to produce mechanical energy;
utilizing said mechanical energy to at least assist in said compressing step; and
transferring heat from the compressed supply of air to the oxygen-depleted stream.

11. A method as set forth in claim 10, wherein heat is transferred to the oxygen-depleted stream at a location upstream of the turbine.

12. A method as set forth in claim 10 or 11, wherein heat is transferred to the oxygen-depleted stream at a location downstream of the turbine.

* * * * *